United States Patent [19]

Schneider

[11] 3,996,881
[45] Dec. 14, 1976

[54] ROTARY INDICATING INSTRUMENT WITH MAGNETIC RESET

[75] Inventor: William H. Schneider, Pittsford, N.Y.

[73] Assignee: Qualitrol Corporation, Fairport, N.Y.

[22] Filed: Sept. 11, 1975

[21] Appl. No.: 612,338

[52] U.S. Cl. .............. 116/129 B; 73/431; 116/129 D
[51] Int. Cl.² ..................... G01D 13/24
[58] Field of Search ....... 116/129 R, 129 A, 129 B; 73/431; 58/91; 156/24; 308/DIG. 7

[56] References Cited
UNITED STATES PATENTS

| | | |
|---|---|---|
| 2,457,286 | 12/1948 | Tollefsen et al. ............ 116/129 B |
| 2,654,253 | 10/1953 | Ford ............................ 73/431 |
| 2,868,959 | 1/1959 | Mayo et al. ............... 116/129 R |
| 3,094,970 | 6/1963 | Zargarpur .................. 116/129 R |
| 3,204,600 | 9/1965 | Aldridge et al. ............ 116/129 R |
| 3,596,178 | 7/1971 | Sklyaruk et al. ............ 116/129 B |
| 3,807,350 | 4/1974 | Powell ....................... 116/129 R |

Primary Examiner—Richard C. Queisser
Assistant Examiner—Daniel M. Yasich
Attorney, Agent, or Firm—Stephen J. Rudy

[57] ABSTRACT

A rotary hand indicating instrument including a maximum hand and having a solid crystal formed with stub shafts projecting axially from its front and rear faces, upon which shafts the maximum hand and associated magnetic resetting control elements are mounted.

12 Claims, 4 Drawing Figures

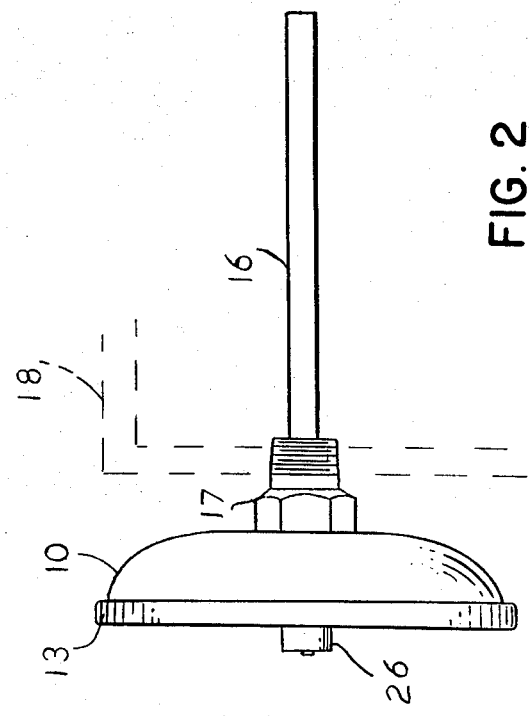
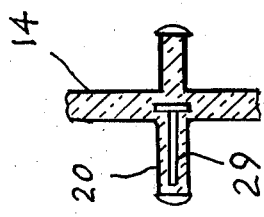
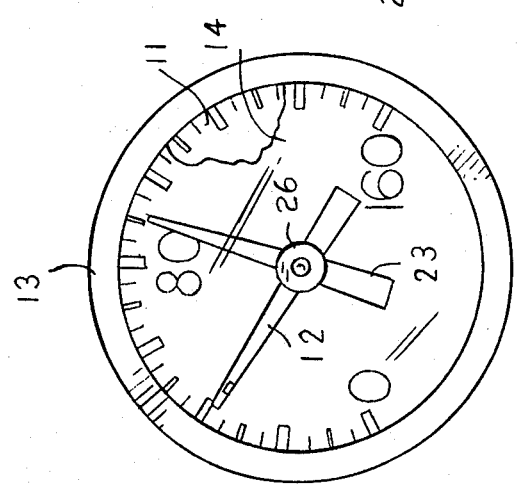
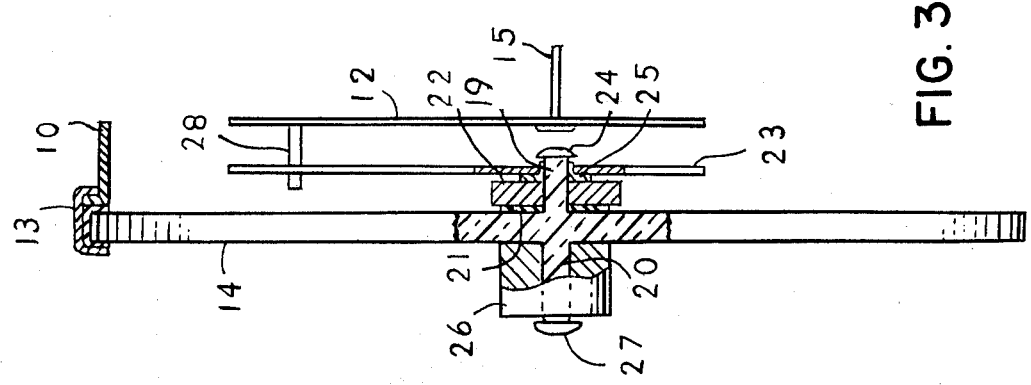

ROTARY INDICATING INSTRUMENT WITH MAGNETIC RESET

BACKGROUND OF THE INVENTION

This invention relates to rotary indicating instruments of the type including, besides a regular indicating hand, a maximum indicating drag hand and associated manually operable resetting means.

Examples of such instruments are thermometers, pressure gages, and tachometers. In instruments of this type the maximum hand is pushed ahead around its axis by the regular hand as the latter is driven relative to a calibrated dial; and it retains its advanced position after the regular hand has fallen back towards its starting position. After a reading is taken of the advanced position of the maximum hand, the latter is resettable by the user to its starting or reference point.

Such instruments are used indoors and outdoors and accordingly are subjected to all kinds of weather. It is particularly desirable to avoid entry of moisture into the instrument because of its undesirable damaging effects upon the working parts and accuracy of the instrument.

The viewing crystal mounted over the front end of the casing of such instruments is customarily sealed against entry of moisture around its periphery. But the provision, as in known instruments, of an axial hole in the crystal for reception of the supporting shaft of the maximum hand to enable the latter to be reset by manipulative means located externally of the instrument is undesirable. A hole of this nature tends to allow seepage of undesirable moisture around the shaft to the interior of the instrument. Accordingly, to protect against such leakage in such mountings the expense and labor of providing a seal about the shaft and hole is needed. Further, in the process of drilling such a hole or assembling the shaft components in it renders the crystal subject to cracking or other damage.

A general objective of this invention is to avoid the foregoing faults so as to provide a moisture proof crystal.

A still further object of the invention is to provide for such instruments improved maximum hand reset means which insures against deviation of the maximum hand from its advanced position under undesirable vibrations to which the instrument may be subjected.

A further objective of this invention is to provide for instruments of this general nature an improved crystal element and an arrangement of the maximum hand relative to the crystal element together with externally operable magnetic means for resetting the maximum hand, whereby an axial hole through the crystal for the supporting shaft of the maximum hand is made unnecessary.

A feature of the present invention is an improved crystal for the instrument, one having a solid transparent body which is provided with integral stub shafts extending axially from opposite faces thereof, upon which shafts the maximum hand and related resetting elements may be mounted whereby there is no need for an undesirable hole in the crystal.

A further feature of the invention lies in the means for resetting the maximum hand to its starting point. This means includes a pair of magnets one of which is disposed on an inner one of the stub shafts adjacent the maximum hand, and another of which is in the form of a manually operable knob mounted upon an outer one of the stub shafts. The magnets are cooperable with one another in effecting resetting of the maximum hand.

Another feature lies in the provision of a friction washer between the inner magnet and the crystal, whereby friction developed by the washer between the inner magnet and the crystal prevents the maximum hand from deviating from its advanced position under the stress of the usual vibrations to which the instrument is subjected.

BRIEF DESCRIPTION OF THE DRAWING

In the accompanying drawing:

FIG. 1 is a front end view of a rotary indicating thermometer instrument embodying the invention;

FIG. 2 is a view of the instrument in side elevation;

FIG. 3 is a detail view in side elevation drawn to a larger scale showing the crystal unit and its relation to the casing and to the regular indicating hand of the instrument; and FIG. 4 is a fragmentary sectional view of the crystal showing the outer stub shaft as having a non-magnetic metal strengthening pin embodied therein.

DESCRIPTION OF PREFERRED EMBODIMENT

While the invention may be incorporated in various instruments for indicating or measuring temperature, pressure, speed or other conditions, it is here illustrated and described as incorporated in a thermometer instrument, such as might be used in indicating the temperature developing in the tank of a fluid type transformer or other device.

The thermometer shown in the drawing as illustrating the invention includes the usual casing 10 having an open front end in which is fitted a dial 11. The latter has a scaled face relative to which the usual regular pointer or hand 12 turns upon its axis. A bezel ring 13 secures a crystal 14 over the open end of the casing, through which crystal the movements of the hand may be observed. The crystal is sealed as by a gasket around its periphery against entry of moisture. The hub of hand 12 is fixed to a rotatable drive shaft 15. Shaft 15 extends axially through the dial and casing into the usual protective tube 16 extending from the rear of the casing.

Within the tube is arranged in conventional manner the usual bi-metal thermal element, not shown, which is connected at one end to the tube and at its other end to the shaft. The thermal element is responsive to temperature changes of the media in which the tube is caused to be disposed to effect turning of the shaft and, as a consequence, turning of the regular hand 12 relative to the dial face to visibly indicate the temperature change.

The casing is fitted at the junction of the tube and rear of the casing with an adaptor or coupling 17 for mounting the instrument to a tank or apparatus 18 containing the fluid or other media to be monitored, or to some other device the temperature of which is to be noted. In this respect, the tube portion 16 is inserted through an opening in the wall of the apparatus, and the adaptor is threadedly engaged in the opening to rigidly secure the instrument in place.

The crystal may be of glass or other suitable transparent material enabling viewing of the movements of the hand 12. Here, it is formed of transparent plastics material. It has an integral pin or stub shaft 19 projecting axially from its inner face into the interior of the casing; and it has a second integral pin or stub shaft 20 projecting from its outer face and axially aligned with the inner stub shaft. The crystal together with its projecting stub shafts is a unitary structure. Here it is a one piece unit formed in suitable manner, as by moulding.

Slidably received upon the inner shaft 19 and supported thereon for relative rotation is an annular magnet 22, and a drag or maximum hand 23. A friction washer 21 is located adjacent the crystal; and the magnet is positioned between the washer and the maximum hand. A retainer, here in the nature of a flange or head 24 formed at the free end of shaft 19, blocks the several elements on the shaft against endwise escape. The maximum hand is here formed of a material that is light in weight, such as aluminum; and it is fitted with a hub 25 of magnetically attractible material, such as soft iron, whereby the hand is drawn into contact with and magnetically held against the adjacent face of the inner magnet 22.

A second magnet in the form of an annular knob 26 is slidably received and supported upon the outer or external shaft 20 for relative rotation. A retainer 27, also in the nature of a flange or head formed at the free end of shaft 20, blocks the knob against endwise escape. The magnets are mutually attracted to each other so that the inner magnet pressures the friction washer 21 against the inner face of the crystal. The friction washer is of a non-magnetic friction material, such as rubber or plastics. Here it is formed of a plastics material commonly known as neoprene.

It is apparent that the crystal 14, together with the several elements supported and retained upon its stub shafts 19 and 20 is a unit or a complete assembly. It is mountable as such to the casing 10; and is securable in place by means of the bezel ring 13. Similarly, it may be removed as a unit from the casing.

In the mounted relation of the crystal to the casing, as indicated in FIG. 3, the maximum hand 23 is disposed with a side thereof in the angular path of movement of a flange or ear 28 projecting forwardly from the regular hand 12. In this arrangement, as the regular hand is driven about by its shaft 15 its ear 28 will abut a side of the maximum hand and push or advance the latter ahead of it around the inner stub shaft 19. In this action, the magnets are restrained by the friction relation of the washer 21 to the inner magnet 22 and to the crystal 14 from rotating with the maximum hand. The driving force acting through the regular hand upon the maximum hand will be adequate to overcome the holding force or drag being exerted by the magnets upon the maximum hand, so that the maximum hand in this action will turn on the stub shaft 19 relative to the inner magnet.

When the regular hand retreats or falls back from its advanced position, as it will automatically do in conventional manner as a consequence of a temperature drop and a corresponding reaction in the bi-metal thermal element acting on the drive shaft 15, the maximum hand will under the magnetic forces of the magnets retain its advanced position. This will enable the operator to know the farthest degree or temperature reading to which the regular hand had advanced during the operation of the instrument.

Not only will the maximum hand retain its advanced position following return of the regular hand, but it will also be restrained by the magnet elements together with the friction washer from creeping or deviating from this position under the usual stressing vibratory forces accompanying operation of the apparatus to which the instrument is mounted. This is understandable in that the inner magnet to which the maximum hand is magnetically adhered is drawn toward the outer magnet causing the friction washer to be pressured against the inner face of the crystal. The friction developed by the washer between the inner magnet and the crystal is adequate together with the combined forces of the magnets to resist the usual vibratory forces acting upon the instrument so as to hold the maximum hand in its advanced position. A desirable advantage gained from this arrangement is in the resultant accuracy or reliability of the maximum hand reading.

After the user has taken a reading of the advanced position of the maximum hand, it becomes a simple matter for him to reset the maximum hand back to its reference or start position. To do this, the operator manually turns the externally located outer magnet or knob 26 in the proper direction until the maximum hand 23 is carried to its reference point. In this action the resistance of the friction washer is overcome, and both magnets together with the maximum hand turn as a unit about the stub shafts. In this turning action the magnets may at times turn relative to the non-magnetic friction washer, and at times the washer may be frictionally carried about with them.

Thermometer instruments as well as other instruments having regular and maximum hands are used outdoors as well as indoors and accordingly are subjected to various weather conditions. A very desirable advantage of a thermometer or other instrument fitted with the present invention is the moisture or leak proof characteristics of its crystal. The shafts 19 and 20, which support the maximum hand and the associated hand resetting magnets, are fixed to, or formed in a moulding process integral with, opposite faces of the crystal; and the maximum hand 23 as well as the resetting external knob 26 rotate relative to the stationary stub shafts. Accordingly, there is no hole or need for a hole in the crystal 14 to receive a rotatable reset shaft around which moisture might leak to damage the internal parts of the instrument.

Either or both stub shafts may be strengthened in the process of moulding the crystal by embodying therein a non-magnetic rigid pin. FIG. 4 shows the crystal 14 as having for this purpose a non-magnetic metal pin 29 embodied in the outer stub shaft 20 with its head located centrally of the crystal.

What is claimed is:

1. In an indicating instrument including a casing having an open front end, a scaled dial fitted in the casing proximate its open end, and a rotatable drive shaft extending axially through the dial carrying an indicating hand on an end thereof forwardly of the dial; a transparent viewing crystal closing over the open front end of the casing and sealed around its periphery against entry of moisture into the casing, the crystal having fixed thereto an axially extending inner stub shaft and an axially extending opposed outer stub shaft, the latter projecting externally of the casing, a magnetically attractible maximum hand slidably mounted upon the inner stub shaft for relative rotation, the indicating hand having a forwardly extending ear adapted as the indicating hand rotates in one direction to engage the maximum hand and advance the latter around the inner stub shaft ahead of the indicating hand, and magnetic means for returning the maximum hand from its advanced position, the magnetic means comprising an annular first magnet mounted upon the inner stub shaft between the crystal and the maximum hand and having rotation relative to the inner stub shaft, and an annular second magnet defining a manipulative knob externally of the casing mounted upon the outer stub shaft for relative rotation, the maximum hand being magnetically attracted to the first magnet, and the first and second magnets being mutually attracted to each other, whereby upon manually rotating the second magnet in a return direction the first magnet and the maximum hand are carried with it.

2. In an indicating instrument as in claim 1, wherein retainer means is provided at a free end of the inner stub shaft to block endwise escape from the latter shaft of the first magnet and maximum hand; and other retainer means is provided at a free end of the outer stub shaft to block endwise escape from the latter shaft of the second magnet.

3. In an indicating instrument as in claim 2, wherein a friction washer is disposed upon the inner stub shaft between the first magnet and the crystal.

4. In an indicating instrument as in claim 3, wherein the first and second magnets are magnetically drawn toward each other whereby the washer is pressured by the first magnet against the crystal and a friction engagement is obtained by the washer with both the crystal and the first magnet.

5. In an indicating instrument as in claim 4, wherein the torque of the drive shaft acting through the ear of the indicating hand upon the maximum hand is adequate to overcome the holding force of the first magnet upon the maximum hand.

6. A crystal unit for the viewing end of an indicating instrument having a rotatable indicating hand adapted as it rotates to advance a maximum hand, the unit comprising a transparent crystal having a solid body, the body having a first stub shaft fixed thereto and projecting axially from an inner face thereof, and a second stub shaft fixed thereto and projecting axially from an outer face thereof; a friction washer disposed on the first stub shaft adjacent the said inner face, a maximum hand slidably and relatively rotatably disposed upon the first stub shaft rearwardly of the washer, an inner magnet slidably and relatively rotatably disposed upon the first stub shaft between the washer and the maximum hand, the maximum hand having a hub portion of magnetically attractible material, and retainer means on a free end of the first stub shaft blocking endwise escape of the washer, magnet, and maximum hand; an outer magnet in the form of a knob slidably and relatively rotatably disposed upon the second stub shaft, and retainer means on a free end of the second stub shaft blocking endwise escape of the outer magnet, the hub of the maximum hand being attracted to the inner magnet, the inner and outer magnets being magnetically attracted toward each other, and the washer being pressured against the inner face of the crystal by the attraction of the inner magnet to the outer magnet so as to frictionally engage the washer with both the crystal and the first magnet.

7. A crystal unit as in claim 6, wherein the body of the crystal together with both stub shafts is a one-piece structure moulded of plastics material.

8. A crystal unit as in claim 6, wherein a nonmagnetic strengthening pin is embodied in the second stub shaft.

9. An indicating instrument including a casing having an open front end, a scaled dial fitted in the casing proximate its open front end, a rotatable drive shaft extending axially through the casing carrying an indicating hand on an end thereof forwardly of the dial, a transparent crystal having a solid body closing over the open front end, means sealing the crystal about its outer edging relative to the open end of the casing, the crystal having an axially extending integral inner stub shaft and an axially extending integral outer stub shaft, a magnetically attractible maximum hand slidably mounted upon the inner stub shaft for relative rotation, a first magnet slidably and rotatably disposed upon the inner stub shaft toward the crystal side of the maximum hand magnetically attracting the latter hand to it, a friction washer disposed upon the inner stub shaft between the first magnet and the crystal, a second magnet mounted externally of the crystal upon the outer stub shaft for relative rotation, the first and second magnets being magnetically attracted toward each other whereby the washer is caused to exert a predetermined friction force on both the crystal and the first magnet so as to effect upon the maximum hand a predetermined drag resistance to relative rotation of the latter, the indicating hand having a forwardly extending ear adapted under torque of the drive shaft as the indicating hand is rotated by the latter in one direction to engage the maximum hand and angularly advance the latter ahead of the indicating hand against the said drag resistance, and the second magnet being manually rotatable in a reverse direction so as to overcome the friction force of the washer and carry the first magnet and the maximum hand with it in said reverse direction.

10. A crystal as in claim 9, wherein the body of the crystal together with both stub shafts is a unitary structure moulded of plastics material.

11. A crystal as in claim 10, wherein a non-magnetic strengthening pin is embodied in the outer stub shaft.

12. A crystal as in claim 9, wherein retainer means is provided at an end of each stub shaft for blocking the said elements mounted thereon against endwise escape.

* * * * *